(12) United States Patent
Riessbeck et al.

(10) Patent No.: US 12,102,255 B2
(45) Date of Patent: Oct. 1, 2024

(54) BREWING APPARATUS AND METHOD FOR OPERATING A BREWING APPARATUS

(71) Applicant: EUGSTER / FRISMAG AG, Amriswil (CH)

(72) Inventors: Wolfgang Riessbeck, Landschlacht (CH); Saadettin Yesil, Allensbach (DE); Patrick Egger, Niederbüren (CH); Roman Scheurer, Felben-Wellhausen (CH)

(73) Assignee: EUGSTER / FRISMAG AG, Amriswil (CH)

( * ) Notice: Subject to any disclaimer, the term of this patent is extended or adjusted under 35 U.S.C. 154(b) by 409 days.

(21) Appl. No.: 17/611,658

(22) PCT Filed: May 20, 2019

(86) PCT No.: PCT/EP2019/062945
§ 371 (c)(1),
(2) Date: Nov. 16, 2021

(87) PCT Pub. No.: WO2020/233783
PCT Pub. Date: Nov. 26, 2020

(65) Prior Publication Data
US 2022/0192414 A1    Jun. 23, 2022

(51) Int. Cl.
*A47J 31/36*    (2006.01)
*A47J 31/40*    (2006.01)
*A47J 31/46*    (2006.01)

(52) U.S. Cl.
CPC ......... *A47J 31/3633* (2013.01); *A47J 31/407* (2013.01); *A47J 31/468* (2018.08)

(58) Field of Classification Search
CPC ..... A47J 31/3633; A47J 31/468; A47J 31/407
(Continued)

(56) References Cited

U.S. PATENT DOCUMENTS

2005/0109214 A1* 5/2005 Bruttin ................ A47J 31/3623
99/279

FOREIGN PATENT DOCUMENTS

| DE | 102010044945 A1 | 12/2011 |
|----|-----------------|---------|
| EP | 2485628 A2      | 8/2012  |

(Continued)

OTHER PUBLICATIONS

International Search Report and Written Opinion dated Jul. 19, 2019, for International Application PCT/EP2019/062945.

*Primary Examiner* — Brent T O'Hern
(74) *Attorney, Agent, or Firm* — The Dobrusin Law Firm P.C.

(57) ABSTRACT

The present invention relates to a brewing apparatus (1) for making a beverage from a single-serve capsule (2), wherein the brewing apparatus (1) has a first brewing-chamber element (3), a second brewing-chamber element (4) and a sealing device (5), wherein the first brewing-chamber element (3) can be moved along a central axis (12) between a loading position, in which the first and the second brewing-chamber elements (3, 4) are spaced apart from one another, and an operating position, in which the first and the second brewing-chamber elements (3, 4) have been moved towards one another to form a substantially closed brewing chamber (10), wherein, in the operating position, the sealing device (5) is arranged between the first and the second brewing-chamber elements (3, 4), wherein the first or second brewing-chamber element (3, 4) has a liquid-feeding device (6) for injecting liquid into a single-serve capsule (2) located in the brewing chamber (10).

15 Claims, 3 Drawing Sheets

Figure 1:
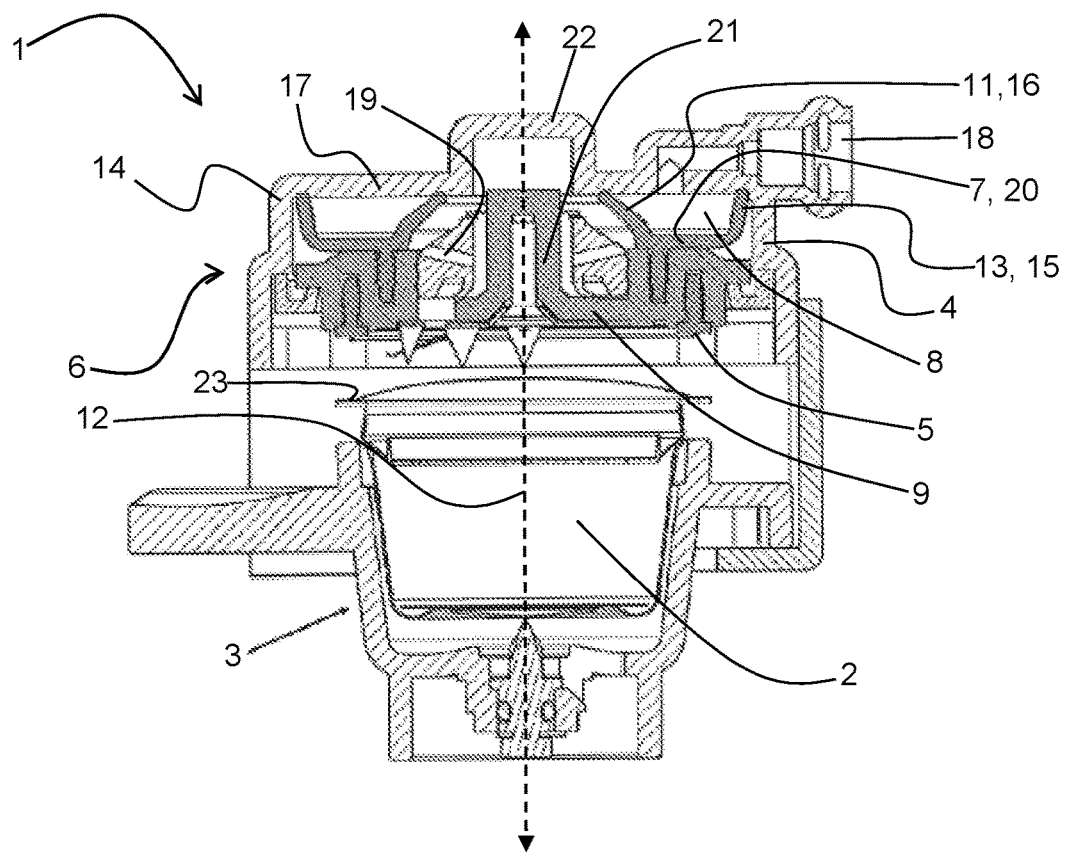
Figure 2:
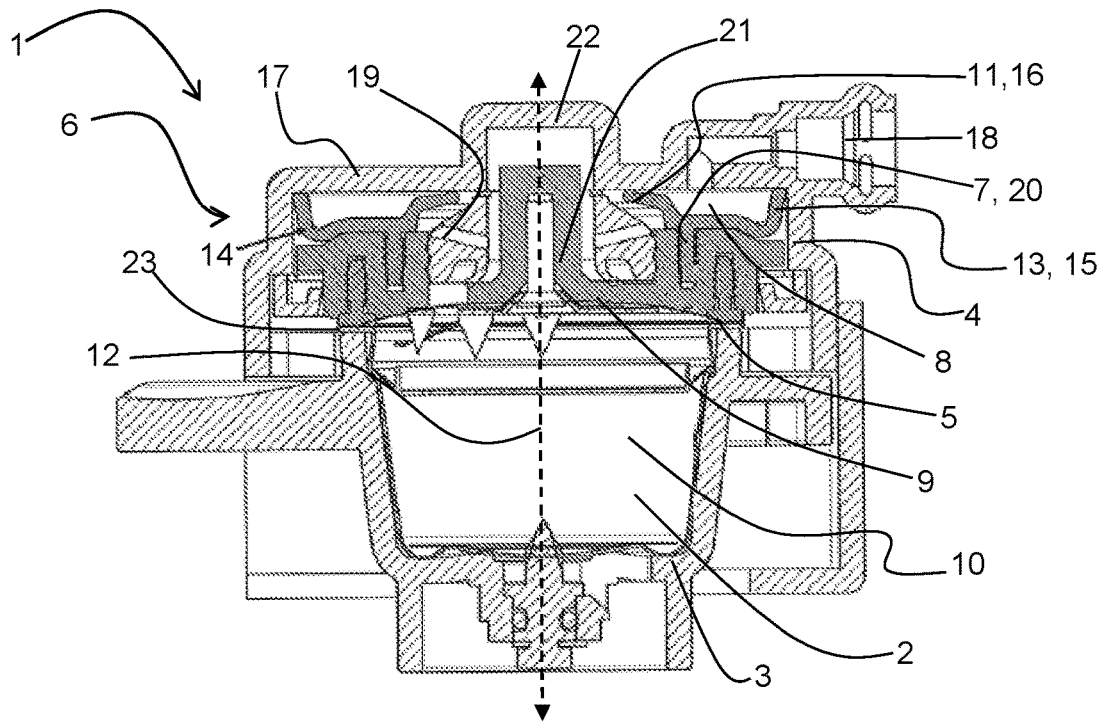

(58) Field of Classification Search
USPC .......................................................... 426/394
See application file for complete search history.

(56) References Cited

FOREIGN PATENT DOCUMENTS

EP          2485628 B1    4/2015
WO     2008/037642 A2    4/2008

* cited by examiner

BREWING APPARATUS AND METHOD FOR OPERATING A BREWING APPARATUS

PRIOR ART

The present invention relates to a brewing apparatus for making a beverage from a single serve capsule, wherein the brewing apparatus has a first brewing chamber element, a second brewing chamber element and a sealing device, wherein the first brewing chamber element is movable along a central axis between a loading position, in which the first and the second brewing chamber element are spaced apart from each other, and a working position, in which the first and the second brewing chamber element are moved toward each other in order to form a substantially closed brewing chamber, wherein, in the working position, the sealing device is arranged between the first and the second brewing chamber element, wherein the first or second brewing chamber element has a liquid supply device for injecting liquid into a single serve capsule situated in the brewing chamber, and wherein the liquid supply device has a pressure space which is delimited with respect to the brewing chamber by a slider which is displaceable along the central axis.

Such a brewing apparatus is disclosed, for example, in the document DE 10 2010 044 945 A1. The brewing apparatus is intended for extracting a single serve capsule for making a beverage, in particular coffee. The brewing apparatus comprises a second brewing chamber element which is designed as a bell-shaped cavity for receiving a single serve capsule which is filled with a beverage substance. A first brewing chamber element designed as a closure element is connected to a toggle lever and is movable along an axial direction from a loading position into an extraction position. In the extraction position, the closure element closes the bell-shaped cavity and forms a substantially closed brewing chamber. An injection arrangement for introducing an extraction liquid into the single serve capsule is arranged on the closure element, the extraction liquid interacting with the beverage substance inside the single serve capsule and then being removed from the single serve capsule by an extraction arrangement arranged on the second brewing chamber element and being supplied to a beverage vessel in order to provide a beverage. In the loading position, in which the closure element and the bell-shaped cavity are spaced apart, the brewing apparatus is loaded with the single serve capsule. The closure element is subsequently displaced into the extraction position by means of the toggle lever. Perforation means which are arranged on the closure element and on the bell-shaped cavity here perforate the single serve capsule such that openings for introducing and conveying out the extraction liquid during the brewing operation are created in the extraction position, wherein a high extraction pressure prevails inside the brewing chamber. It is known for brewing apparatuses of this type to be equipped by means of a toggle lever joint which displaces the closure element from a loading position into an extraction position in order to form a substantially closed brewing chamber.

A disadvantage of such brewing apparatuses is that the high extraction pressure prevailing in the brewing chamber during the brewing operation has to be absorbed solely by the toggle lever joint, and therefore it is not possible for a brewing chamber which is secure against leakage of the extraction liquid and is adequately tight to be guaranteed. The use of a toggle lever joint which meets requirements of this type is highly complex and expensive. It is therefore desirable to provide a brewing apparatus which holds a brewing chamber, which is under high extraction pressure during the brewing operation, in a closed state in such a manner, and thus secures said brewing chamber against leakage of the extraction liquid, that the entire force due to the high extraction pressure in the brewing chamber does not have to be compensated for solely by a toggle lever joint. Moreover, it is desirable to provide a brewing apparatus which has a high level of sealing of the brewing chamber while at the same time having low production and material costs.

The document WO 2008/037 642 A1 solves this problem by the mechanical closing of the brewing chamber being followed by filling of a pressure chamber with the extraction liquid which is under pressure, and, by means of the pressure increase in the pressure chamber, the sealing action of a seal arranged between the brewing chamber element and the flange of the single serve capsule being increased while the beverage is produced in the brewing chamber. The extraction liquid enters. A disadvantage of this solution is that the design of the brewing chamber is firstly comparatively complicated and thus costly and that secondly the extraction liquid is always also injected immediately into the brewing chamber, as a result of which a counterforce is produced in the brewing chamber, the counterforce counteracting, and therefore at least partially compensating for, the force emanating from the pressure chamber in the direction of the seal.

The document EP 2 485 628 B1 discloses another brewing apparatus, in which the extraction liquid is, however, firstly only conducted into a pressure chamber so that the hydraulic buildup of pressure presses a movable piston of the brewing chamber element in the direction of the opposite brewing chamber element, and therefore the brewing chamber is sealed. In addition, the pressure chamber is fluidically connected to a heating element and to an external valve which is connected in turn to the brewing chamber. The external valve opens only when a predetermined pressure is reached, and conducts the extraction liquid through the heating element in the direction of the brewing chamber. Although the abovementioned problems do not occur in this solution, this solution is comparatively complicated, expensive, error-prone and takes up a large amount of space, for example because the supply for the extraction liquid has to be guided repeatedly into the brewing chamber piston and, for the connection of the external valve and heating element, has to be temporarily completely removed again from the brewing chamber piston.

DISCLOSURE OF THE INVENTION

The invention is therefore based on the object of providing a brewing apparatus and a method for operating a brewing apparatus which does not have the disadvantages explained in conjunction with the prior art and in particular permits a particularly compact, cost-effective and simple implementation of a pressure space mounted upstream of the brewing chamber and having a pressure relief device.

This object is achieved according to the invention by a brewing apparatus for making a beverage from a single serve capsule, wherein the brewing apparatus has a first brewing chamber element, a second brewing chamber element and a sealing device, wherein the first brewing chamber element is movable along a central axis between a loading position, in which the first and the second brewing chamber element are spaced apart from each other, and a working position, in which the first and the second brewing chamber element are moved toward each other in order to form a substantially closed brewing chamber, wherein, in the working position, the sealing device is arranged between the first and the second brewing chamber element, wherein the first or second brewing chamber element has a liquid supply device for injecting liquid into a single serve capsule situated in the brewing chamber, wherein the liquid supply device has a pressure space which is delimited with respect to the brewing chamber by a slider which is displaceable along the central axis, wherein the slider has the sealing device on a side facing the brewing chamber and a sealing element with an integrated pressure relief device on a side facing the pressure space.

The brewing apparatus according to the invention has the advantage over the prior art that the slider with a sealing element combines two functions, i.e. both the realization of the pressure chamber in order to improve the sealing action of the sealing device by hydraulic buildup of pressure, and the pressure relief device for injecting the liquid into the brewing chamber only after a predetermined pressure threshold value is reached in the pressure chamber, and therefore permits a very compact design of the brewing chamber with significantly improved sealing. In addition, the comparatively simple design permits a cost-effective implementation and a reliable functioning. In particular, no separate components are required, and the supply of the extraction liquid does not have to be removed again from the movable brewing chamber element. In addition, the closing force for achieving and maintaining the desired sealing even at high extraction pressures does not have to be brought about by the mechanical closing mechanism of the brewing chamber, which closing mechanism can be driven manually or by motor. The first and/or second brewing chamber element are/is preferably displaceable linearly between the loading position and the working position. It is conceivable for the first brewing chamber element to comprise an in particular stationary, bell-shaped receptacle for the single serve capsule, while the second brewing chamber element comprises a closure element which is displaceable linearly along the central axis between the loading position and the working position and in which the liquid supply device and the slider with the sealing element and pressure relief device are integrated. During the filling of the brewing apparatus, the single serve capsule is introduced in the loading position preferably along a loading direction, which is oriented perpendicularly to the central axis, between the first and the second brewing chamber element and, when the brewing chamber is closed, is moved by the second brewing chamber element in the direction of the first brewing chamber element such that the single serve capsule is pushed into the receptacle. Alternatively, it is conceivable for the first brewing chamber element, which is designed as a receiving element, to be manually removable from the brewing apparatus to be fitted with a single serve capsule, and therefore, after the first brewing chamber element which is fitted with a new single serve capsule has been reinserted, the second brewing chamber element is only moved from the loading position into the working position. The liquid is in particular hot water which is under pressure for brewing a raw beverage substance contained in the single serve capsule, in particular roasted coffee bean particles, instant coffee powder, blended tea, chocolate and cocoa powder, milk powder and the like.

Advantageous refinements and developments of the invention can be gathered from the dependent claims, and from the description with reference to the drawings.

According to a preferred embodiment of the present invention, it is provided that the sealing element is formed concentrically and rotationally symmetrically with respect to the central axis. The brewing chamber is preferably formed in a rotationally symmetrical manner about the central axis in order to receive the single serve capsule, which is in particular formed in a rotationally symmetrical manner, in a form-fitting manner. The sealing element can therefore ensure encircling and complete sealing of the brewing chamber in the working position. In particular, the sealing device is a seal which is pressed in the working position onto an encircling flange, which may be covered with a cover film.

According to a further preferred embodiment of the present invention, it is provided that the first or second brewing chamber element has a piston housing in which the slider is mounted displaceably along the central axis, wherein the sealing element has a dynamic outer seal for sealing the slider in relation to an inner wall of the piston housing, said inner wall extending at least in regions parallel to the central axis. The dynamic outer seal preferably comprises an encircling outer sealing lip, the free end of which is pressed by pressure in the pressure space in the direction of the inner wall of the piston housing. The pressure increase in the pressure space advantageously thus ensures not only an improvement in the sealing action of the sealing device, but at the same time also improved sealing between the slider and the piston housing by the pressure increase in the pressure space ensuring that the outer sealing lip is pressed onto the inner wall of the piston housing such that no loss of pressure in the pressure chamber can occur because of the gap between slider and inner wall.

According to a further preferred embodiment of the present invention, it is provided that the piston housing has a rear wall which extends at least in regions perpendicular to the central axis and forms a wall of the pressure space opposite the slider. The pressure relief device preferably comprises an encircling inner sealing lip, the free end of which presses in its starting position against the rear wall and, when a pressure threshold value in the pressure space is exceeded, is pressed into a release position spaced apart from the rear wall. The liquid supply device preferably has a liquid inlet, which opens into the pressure space, and a liquid outlet, which opens into the brewing chamber, wherein the liquid outlet is fluidically connected to the liquid inlet only when the inner sealing lip is in the release position. The inner encircling sealing lip acts as a pressure relief device by being pressed away from the rear wall when a predetermined pressure is reached in the pressure space and thus releasing the inlet to the brewing chamber. It is thereby ensured that the liquid enters the brewing chamber only when the sealing action of the sealing device is at a sufficiently high level.

According to a further preferred embodiment of the present invention, it is provided that the sealing element on its side facing the rear wall has a connecting region which runs substantially perpendicularly to the central axis, extends from the inner sealing lip to the outer sealing lip and comprises a fastening device facing the slider. Inner sealing lip and outer sealing lip can thus advantageously be realized in the form of the integral sealing element, and therefore a particularly cost-effective implementation and assembly of the brewing apparatus is permitted. In addition, the entire slider is formed comparatively compactly, and therefore the extent of the brewing apparatus in particular along the central axis by the implementation of pressure chamber and slider is scarcely larger than in the case of a conventional brewing apparatus without a pressure chamber.

According to a further preferred embodiment of the present invention, it is provided that the slider on its side facing the rear wall has a central projection which is mounted in an axially displaceable manner in a corresponding guide on the piston housing, said guide being formed centrally on the rear wall. The slider is advantageously guided and supported along its movement parallel to the central axis by its projection, which is mounted in a sliding manner in the guide of the rear wall.

According to a further preferred embodiment of the present invention, it is provided that the liquid inlet is fluidically connected to a liquid reservoir via a pump and/or a thermocouple. The pump for placing the liquid under pressure and/or the thermocouple for heating up the liquid lie in the flow direction of the liquid, in particular upstream of the pressure space.

A further subject of the present invention is a method for operating the brewing apparatus according to the invention, wherein, in a first method step, a single serve capsule is provided between the first and the second brewing chamber element, and wherein, in a following second method step, the first or second brewing chamber element is moved from the loading position into the working position, and wherein, in a third method step, liquid is made to flow into the pressure space, as a result of which the pressure increase in the pressure space firstly, in the first substep, causes the slider to be displaced along the central axis in the direction of the brewing chamber in order to bring about the sealing action of the sealing device and, in the second substep, when a predetermined pressure threshold value in the pressure space is reached, subsequently activates the pressure relief device, as a result of which the liquid is injected into the brewing chamber. The provision of the single serve capsule in the first method step can take place in particular either by the first and/or second brewing chamber element being fitted with the single serve capsule and then being arranged in the brewing apparatus, or by the single serve capsule being arranged directly in the space between the first and the second brewing chamber element.

According to a preferred embodiment of the present invention, it is provided that during the third method step, the pressure in the pressure space causes a free end of an encircling outer sealing lip of the sealing element to be pressed against the inner wall of a piston housing of the first or second brewing chamber element.

According to a further preferred embodiment of the present invention, it is provided that during the third method step, the pressure in the pressure space causes the sealing device to be pressed against a flange of the single serve capsule or against the second or first brewing chamber element.

According to a further preferred embodiment of the present invention, it is provided that during the first substep, the pressure space is sealed toward a liquid outlet opening into the brewing chamber by an encircling inner sealing lip of the pressure relief device.

According to a further preferred embodiment of the present invention, it is provided that during the second substep, the encircling inner sealing lip is spaced apart from a rear wall of the piston housing by the pressure in the pressure space in order to bring the liquid outlet into fluidic connection with the pressure space.

The invention is explained in more detail below with reference to exemplary embodiments which are illustrated in drawings. The drawings illustrate embodiments of the invention that are merely by way of example and that do not restrict the essential inventive concept.

FIGS. 1 to 5 show schematic views of sectional images of a brewing apparatus according to an exemplary embodiment of the present invention.

In the various figures, identical parts are always provided with the same reference signs and are therefore generally also named or mentioned only once in each case.

FIG. 1 illustrates a starting situation of the brewing apparatus 1 according to the invention for making a beverage from a single serve capsule 2.

The brewing apparatus 1 here comprises a first brewing chamber element 3 and a second brewing chamber element 4. The first brewing chamber element 3 is designed as a bell-shaped receiving element in which the single serve capsule 2 is accommodated in a form-fitting manner. The base of the single serve capsule 2 rests here on the base of the receiving element while an encircling capsule flange 23, on the upper side of which the single serve capsule 2 is closed by a cover film, rests on an edge projection of the first brewing chamber element 3.

The second brewing chamber element 4 is designed as a closure element for the receiving element. The second brewing chamber element 4 is displaceable linearly in relation to the first brewing chamber element 3 along a central axis 12, which runs centrally through the first and the second brewing chamber element 3, 4, between a working position and a loading position. In FIG. 1, the second brewing chamber element 4 is in the loading position in which the second brewing chamber element 4 is spaced apart from the first brewing chamber element 3 such that the first brewing chamber element 3 can be inserted manually into the brewing apparatus 1 (or alternatively a single serve capsule 2 can be arranged by hand by a user between the first and the second brewing chamber element 3, 4). In FIGS. 2 to 5, the second brewing chamber element 4 is in each case in the working position in which the second brewing chamber element 4 is brought toward the second brewing chamber element 4 in such a manner that the capsule flange 23 is clamped between the edge projection of the first brewing chamber element 3 and a sealing device 5 formed on the second brewing chamber element 4. In the working position, the first and the second brewing chamber element 3, 4 form a hermetically sealed brewing chamber 10 in which the single serve capsule 2 is situated.

During the transfer of the second brewing chamber element 4 from the loading position into the working position, the single serve capsule 2 is thus pushed into the receiving element in a form-fitting manner. The base of the receiving element has a central piercing spike which pierces the base of the single serve capsule 2 as soon as the second brewing chamber element 4 is moved from the loading position into the working position. Analogously, the second brewing chamber element 4 on its side facing the single serve capsule 2 has a plurality of perforation points which perforate the cover film of the single serve capsule 2 as soon as the second brewing chamber element 4 is moved from the loading position into the working position. The second brewing chamber element 4 has a liquid supply device 6 through which liquid, in particular hot water, is injected under pressure into the brewing chamber 10. The liquid passes here through the perforation openings, which are produced in the cover film by means of the perforation points, into the interior of the single serve capsule 2 and can interact there with the raw beverage substance arranged inside the single serve capsule 2, in order to produce the desired beverage which can then leave the single serve capsule 2 and the brewing chamber 10 through the opening produced in the base of the single serve capsule 2 by means of the piercing spike, and is conducted to a beverage removal point.

The second brewing chamber element 4 has a piston housing 14 in which a slider 9 is arranged in a linearly displaceable manner relative to the piston housing 14 parallel and antiparallel to the central axis 12. That side of the slider 9 which faces the first brewing chamber element 3 acts as the actual closure element for forming the brewing chamber 10, the closure element coming into contact with the cover film in the working position. In addition, the sealing device 5 in the form of an annular seal concentrically encircling the central axis 12, and the perforation points are fastened to this side of the slider 9.

On a side facing away from the brewing chamber 10, the second brewing chamber element 4 has a pressure space 8 which is designed as part of the liquid supply device 6 and which is formed between the slider 9 and a rear wall 17 of the piston housing 14. The rear wall 17 extends at least in regions perpendicularly to the central axis 12. The pressure space 8 is designed in particular as an annular space encircling the central axis 12 concentrically.

The liquid supply device 6 furthermore has a liquid inlet 18 which opens into the pressure space 8. The liquid inlet 18 is directly fluidically connected to a pump and to a thermocouple. The pump conveys liquid from a liquid reservoir to the liquid supply device 6. The liquid is conveyed here through the thermocouple and thereby heated. Furthermore, the liquid supply 6 has a liquid outlet 19 which opens into the brewing chamber 10.

On a side of the slider 9 facing the rear wall 17, the slider 9 has a sealing element 7. The sealing element 7 is designed here as an integral, annular sealing element 7 which likewise extends concentrically and rotationally symmetrically about the central axis 12. The sealing element 7 here has an encircling inner sealing lip 16, an encircling outer sealing lip 15 and an encircling connecting region 20 connecting the inner and the outer sealing lips 15, 16 to each other in the radial direction. The sealing element 7 is designed in particular as an integral rubber ring part or as a rubber-like ring part. The outer sealing lip 15 lies with its encircling free end against an inner wall of the piston housing 14. The outer sealing lip 15 therefore forms an outer seal 13 which prevents liquid from passing from the pressure space 8 into the encircling slot between slider 9 and inner wall of the piston housing 14. The outer seal 13 acts here as a hydraulic seal by being pressed against the inner wall by a buildup of pressure in the pressure space 8 owing to liquid flowing under pressure into the pressure space 8. The sealing action of the outer seal 13 becomes greater as the pressure in the pressure space 8 increases.

At the same time, a buildup of pressure in the pressure space 8 ensures that the slider 9 is pressed along the central axis 12 in the direction of the brewing chamber 10. The sealing action of the sealing device 5 is also increased by this hydraulic pressurization of the slider 9 by the sealing device being pressed to an ever greater extent against the flange 23 of the single serve capsule 2 as the pressure in the pressure space 8 increases.

In the starting position illustrated in FIGS. 1 to 4, the inner sealing lip 14 lies with its encircling free end against the rear wall 17 of the piston housing 14. The inner sealing lip 14 therefore blocks a direct fluidic connection between the pressure space 8 and the liquid inlet 18, and therefore liquid conveyed into the pressure space 8 by means of the pump cannot initially leave the pressure space 8 and leads there to a pressure increase which at the same time increases the sealing action of the sealing device 5 and of the outer seal 13.

Figure 5:
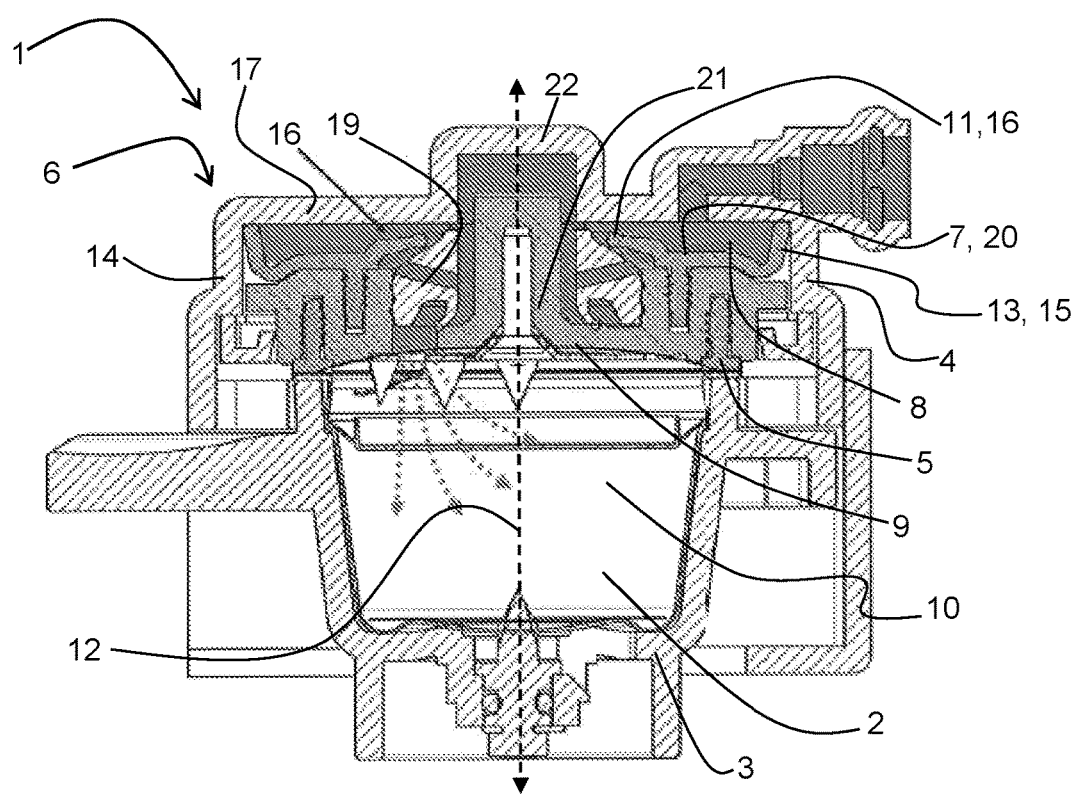

If the pressure in the pressure chamber 8 exceeds a pressure threshold value, which depends on the mechanical rigidity or flexibility of the inner sealing lip 14, the inner sealing lip 16 is pressed from said starting position into the release position which is illustrated in FIG. 5 and in which it is spaced apart from the rear wall 17. The fluidic connection between the pressure space 8 and the brewing chamber 10 is thereby released, and therefore the liquid is conveyed into the brewing chamber 10 and thus into the single serve capsule 2 for making the beverage. The inner sealing lip 16 therefore forms a pressure relief device 11 which is integrated in the pressure element 7 because of the integral configuration of the pressure element 7.

In order to guide the displacement of the slider 9 along the central axis 12, the slider 12 on its side facing away from the brewing chamber 10 has a central cylindrical projection 21. The projection 21 is guided in a longitudinally displaceable manner in a corresponding cylindrical guide which is arranged centrally on the rear wall 17 of the piston housing 14.

The functioning of the brewing apparatus 1 according to the invention is as follows:

After the brewing apparatus 1 has been loaded with a new single serve capsule 2 and/or the first brewing chamber element 3 loaded with a new single serve capsule 2 has been inserted (or pivoted) into the brewing apparatus 1 (cf. FIG. 1), the brewing chamber 10 is closed by the second brewing chamber element 4 being moved from the loading position into the working position (cf. FIG. 2), as a result of which the cover film and the capsule base are perforated and the sealing device 5 already passes into sealing engagement with the capsule flange 23.

Figure 3:
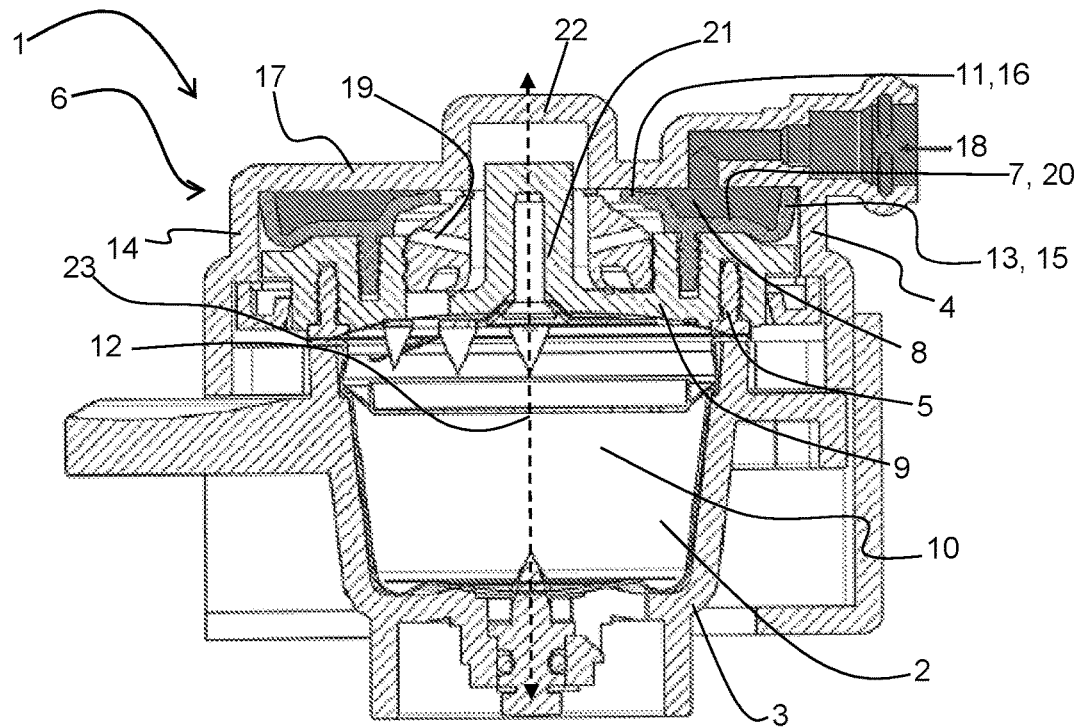
Figure 4:
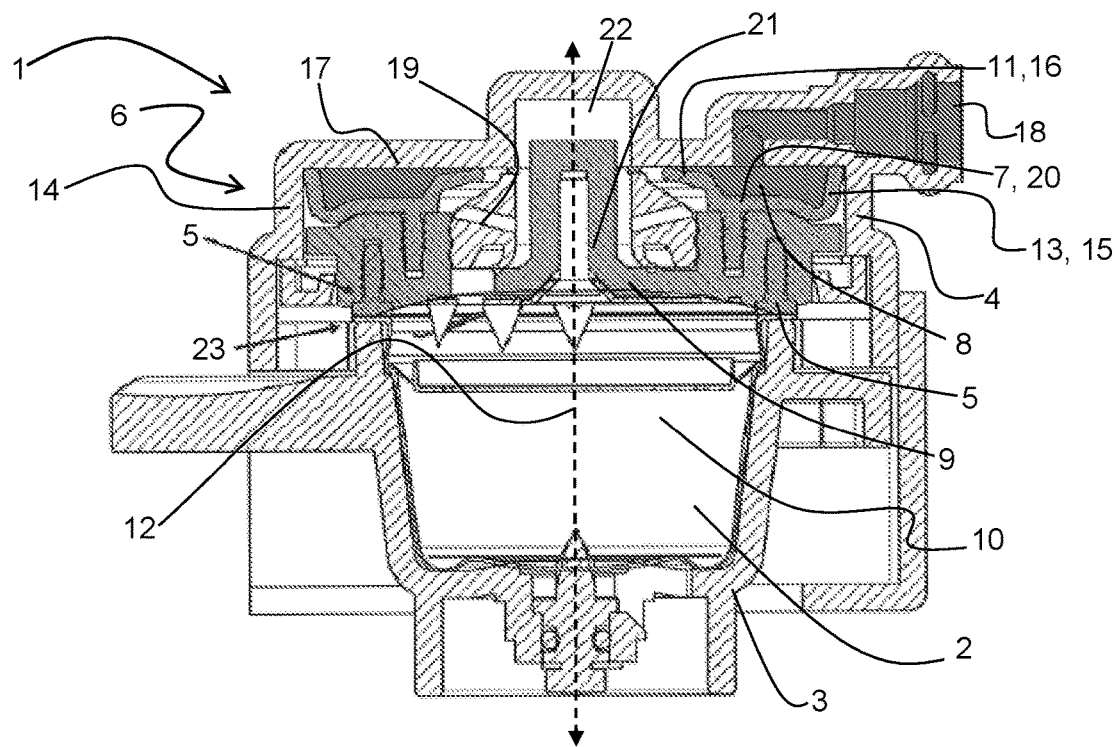

The pump is subsequently activated, as a result of which liquid heated by means of the thermocouple is conveyed out of the liquid reservoir through the liquid inlet 18 into the pressure space 8 (cf. FIG. 3). At this time, the inner sealing lip 16 is not in its starting position and therefore blocks the fluidic connection to the brewing chamber 10. The liquid is therefore conveyed only into the pressure space 8, and therefore the pressure in the pressure space 8 continuously increases. By this means, the slider 9 is displaced in the direction of the brewing chamber 10, as a result of which the sealing action of the sealing device 5 increases (cf. FIG. 4). In addition, the outer sealing lip 15 is pressed against the inner wall, and therefore the sealing action of the outer seal 13 also increases.

When the pressure in the pressure space 15 has increased to such an extent that the pressure threshold value is reached, the inner sealing lip 16 is pressed into its release position, as a result of which the fluidic connection to the brewing chamber 10 is released (cf. FIG. 5). The liquid can only now flow from the pressure space 8 or from the pump through the liquid outlet 19 into the single serve capsule 2, as a result of which the beverage that is to be made is produced.

LIST OF REFERENCE SIGNS

1 Brewing apparatus
2 Single serve capsule
3 First brewing chamber element
4 Second brewing chamber element
5 Sealing device
6 Liquid supply device
7 Sealing element
8 Pressure space
9 Slider
10 Brewing chamber
11 Pressure relief device
12 Central axis
13 Outer seal 14 Piston housing
15 Outer sealing lip
16 Inner sealing lip
17 Rear wall
18 Liquid inlet
19 Liquid outlet
20 Connecting region
21 Projection
22 Guide
23 Capsule flange

The invention claimed is:

1. A brewing apparatus for making a beverage from a single serve capsule, wherein the brewing apparatus has a first brewing chamber element, a second brewing chamber element and a sealing device, wherein the first brewing chamber element is movable along a central axis between a loading position, in which the first brewing chamber element and the second brewing chamber element are spaced apart from each other, and a working position, in which the first brewing chamber element and the second brewing chamber element are moved toward each other in order to form a substantially closed brewing chamber, wherein, in the working position, the sealing device is arranged between the first brewing chamber element and the second brewing chamber element, wherein the first brewing chamber element or the second brewing chamber element has a liquid supply device for injecting liquid into a single serve capsule situated in the brewing chamber, wherein the liquid supply device has a pressure space which is delimited with respect to the brewing chamber by a slider which is displaceable along the central axis, wherein the slider has the sealing device on a side facing the brewing chamber and a sealing element with an integrated pressure relief device on a side facing the pressure space.

2. The brewing apparatus as claimed in claim 1, wherein the sealing element is formed concentrically and rotationally symmetrically with respect to the central axis.

3. The brewing apparatus as claimed in claim 1, wherein the first brewing chamber element or the second brewing chamber element has a piston housing in which the slider is mounted displaceably along the central axis, wherein the sealing element has a dynamic outer seal for sealing the slider in relation to an inner wall of the piston housing, said inner wall extending at least in regions parallel to the central axis.

4. The brewing apparatus as claimed in claim 3, wherein the dynamic outer seal comprises an encircling outer sealing lip, a free end of which is pressed by pressure in the pressure space in a direction of the inner wall of the piston housing.

5. The brewing apparatus as claimed in claim 3, wherein the piston housing has a rear wall which extends at least in regions perpendicular to the central axis and forms a wall of the pressure space opposite the slider.

6. The brewing apparatus as claimed in claim 5, wherein the pressure relief device comprises an encircling inner sealing lip, a free end of which presses in its starting position against the rear wall and, when a pressure threshold value in the pressure space is exceeded, is pressed into a release position spaced apart from the rear wall.

7. The brewing apparatus as claimed in claim 6, wherein the liquid supply device has a liquid inlet, which opens into the pressure space, and a liquid outlet, which opens into the brewing chamber, wherein the liquid outlet is fluidically connected to the liquid inlet only when the inner sealing lip is in the release position.

8. The brewing apparatus as claimed in claim 6, wherein the sealing element on its side facing the rear wall has a connecting region which runs substantially perpendicularly to the central axis, extends from the inner sealing lip to an outer sealing lip and comprises a fastening device facing the slider.

9. The brewing apparatus as claimed in claim 5, wherein the slider on its side facing the rear wall has a central projection which is mounted in an axially displaceable manner in a corresponding guide on the piston housing, said guide being formed centrally on the rear wall.

10. The brewing apparatus as claimed in claim 1, wherein the liquid supply device has a liquid inlet, and wherein the liquid inlet is fluidically connected to a liquid reservoir via a pump and/or a thermocouple.

11. A method for operating the brewing apparatus as claimed in claim 1, wherein, in a first method step, a single serve capsule is provided between the first brewing chamber element and the second brewing chamber element, and wherein, in a following second method step, the first brewing chamber element or the second brewing chamber element is moved from the loading position into the working position, and wherein, in a third method step, liquid is made to flow into the pressure space, as a result of which a pressure increase in the pressure space firstly, in a first substep, causes the slider to be displaced along the central axis in a direction of the brewing chamber in order to bring about a sealing action of the sealing device and, in a second substep, when a predetermined pressure threshold value in the pressure space is reached, subsequently activates the pressure relief device, as a result of which the liquid is injected into the brewing chamber.

12. The method as claimed in claim 11, wherein, during the third method step, the pressure in the pressure space causes a free end of an encircling outer sealing lip of the sealing element to be pressed against an inner wall of a piston housing of the first brewing chamber element or the second brewing chamber element.

13. The method as claimed in claim 11, wherein, during the third method step, the pressure in the pressure space causes the sealing device to be pressed against a flange of the single serve capsule or against the second brewing chamber element or the first brewing chamber element.

14. The method as claimed in claim 11, wherein, during the first substep, the pressure space is sealed toward a liquid outlet opening into the brewing chamber by an encircling inner sealing lip of the pressure relief device.

15. The method as claimed in claim 14, wherein, during the second substep, the encircling inner sealing lip is spaced apart from a rear wall of the piston housing by the pressure in the pressure space in order to bring the liquid outlet into fluidic connection with the pressure space.

* * * * *